Dec. 19, 1967   R. A. PALMER   3,358,566
PNEUMATIC ACTUATOR AND PARTS THEREFOR OR THE LIKE
Filed Feb. 23, 1965
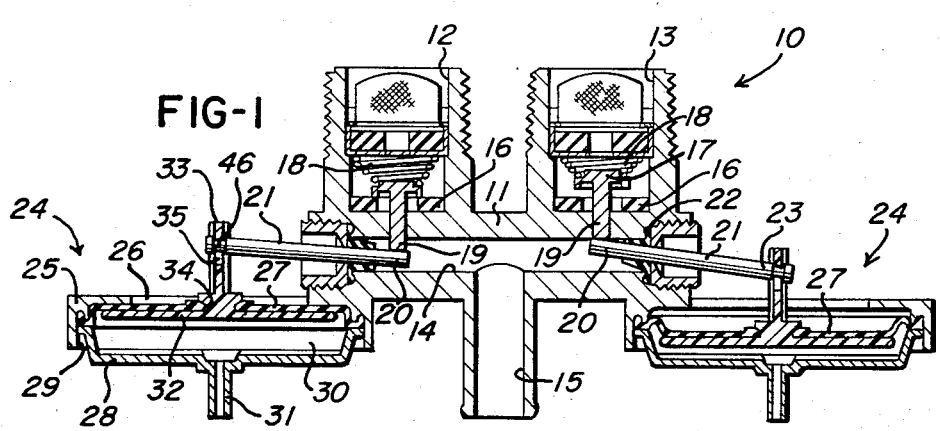
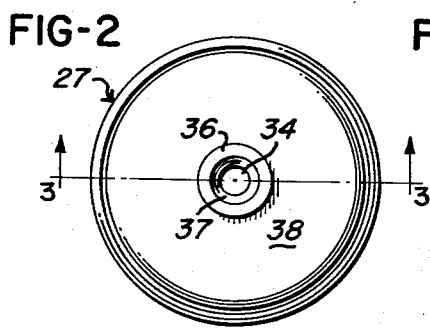
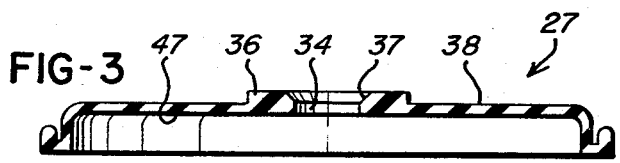
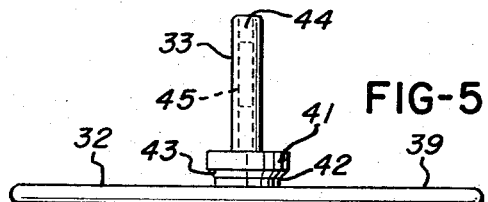
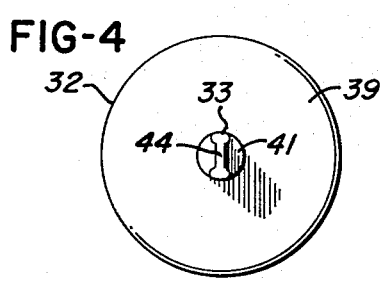
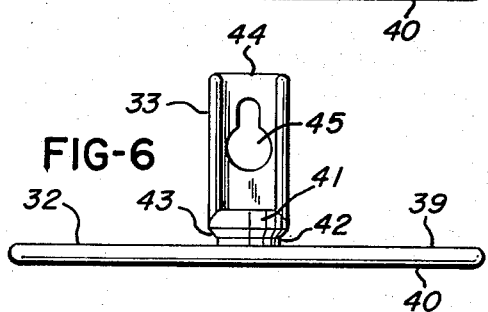
INVENTOR.
REED A. PALMER
BY
Cauder & Cauder
HIS ATTORNEYS

United States Patent Office 3,358,566
Patented Dec. 19, 1967

3,358,566
PNEUMATIC ACTUATOR AND PARTS
THEREFOR OR THE LIKE
Reed A. Palmer, Los Alamitos, Calif., assignor to Robertshaw Controls Company, Richmond, Va., a corporation of Delaware
Filed Feb. 23, 1965, Ser. No. 434,208
4 Claims. (Cl. 92—99)

This invention relates to an improved vacuum operated actuator, as well as to improved parts for such as actuator and the like.

It has been found that when a vacuum operated actuator is formed from a flexible diaphragm being carried by a housing means to define a chamber therewith, some means must be provided to interconnect an actuating post with the flexible diaphragm so that the actuating post can operate suitable structure as the flexible diaphragm is drawn toward or away from the housing means during actuation thereof.

In the past, the diaphragm carried a rigid plate securely fastened to the center thereof and usually riveted in such a manner to provide a fluid tight seal so that the operating stem or post could be connected to the plate.

However, according to the teachings of this invention, an improved pneumatic actuator is provided wherein the actuating post can be integral with the plate and pass through an aperture in the flexible diaphragm so that the plate is disposed on the inside surface of the diaphragm and will cooperate therewith to provide a fluid seal around the aperture when a vacuum condition exists in the chamber.

Accordingly, it is an object of this invention to provide an improved pneumatic actuator having one or more of the novel features set forth above or hereinafter shown or described.

Another object of this invention is to provide an improved part for such an actuator and the like.

Other objects, uses and advantages of this invention are apparent from a reading of this description, which proceeds with reference to the accompanying drawings forming a part thereof and wherein:

FIGURE 1 is a cross-sectional view illustrating the pneumatic actuator of this invention being utilized in a water mixing valve or the like.

FIGURE 2 is a top plan view of the diaphragm of this invention.

FIGURE 3 is an enlarged cross-sectional view taken on line 3—3 of FIGURE 2.

FIGURE 4 is a top view of the plate and actuator post of this invention.

FIGURE 5 is an enlarged side view of the structure illustrated in FIGURE 4.

FIGURE 6 is another enlarged side view of the structure illustrated in FIGURE 4.

While the various features of this invention are hereinafter described and illustrated as being particularly applicable to provide actuating means for a water mixing valve or the like, it is to be understood that the various features of this invention can be utilized singly or in any combination thereof to provide actuating means for other devices as desired.

Therefore, this invention is not to be limited to only the embodiment illustrated in the drawings, because the drawings are merely utilized to illustrate one of the wide variety of uses of this invention.

Referring now to FIGURE 1, a water mixing valve is generally indicated by the reference numeral 10 and comprises a housing 11 having a pair of inlets 12 and 13 provided therein and interconnected to a manifold 14, the manifold 14 being interconnected to a single outlet 15.

A pair of valve seats 16 are disposed in the inlets 12 and 13 and are opened and closed by valve members 17 normally urged to their closed positions by compression springs 18. Each valve member 17 has a stem 19 projecting through the respective valve seat 16 and engageable with an end 20 of a rocker arm 21 pivotally mounted in the housing 11 by a resilient member 22.

The other end 23 of each rocker arm 21 is interconnected to a vacuum operated actuator means 24 of this invention.

Since each actuator means 24 for the water mixing valve 10 is identical, only one such actuator means 24 will be described, and the description thereof applies equally well to the other actuator means 24.

As illustrated in FIGURE 1, the housing means 11 includes a cantilevered portion 25 having an aperture 26 passing therethrough. A flexible diaphragm 27 spans the opening 26 and is held against the housing means 25 by a cup-shaped housing member 28 snapped in the counterbore 29 of the housing means 25 whereby the diaphragm 27 and the cup-shaped housing member 28 define a chamber 30 therebetween.

The chamber 30 is adapted to be interconnected to a vacuum source by a nipple means 31.

A substantially circular plate 32 is disposed in the chamber 30 and has an actuating post 33 integral therewith and passing through an aperture 34 in the diaphragm 27, the post 33 having opening means 35 passing therethrough and receiving the end 23 of the respective rocker arm 21.

Thus, where atmospheric conditions exist in the chambers 30 of the actuators 24, the compression springs 18 force the valve members 17 against the valve seats 16 in the manner illustrated in the left-hand portion of FIGURE 1 to prevent the flow of fluid through the water mixing valve 10. However, when one or both chambers 30 of the actuating means 24 are evacuated, the diaphragms 27 thereof are pulled downwardly therewith whereby the ends 23 of the rocker arms 21 are pulled downwardly to cause upward movement of the valve member 17 in the manner illustrated in the right-hand portion of FIGURE 1 to provide fluid flow through the water mixing valve 10.

The diaphragms 27 and plate and post means 32 and 33 are so constructed in a manner hereinafter described that when the vacuum is initially interconnected to the chamber 30 of a particular actuator 24, the diaphragm 27 is pulled against a large area of the plate 32 to provide a fluid seal around the aperture 34 to prevent leakage from the chamber 30 whereby the diaphragm 27 can be pulled downwardly to operate the rocker arm 21 in the manner previously described.

In particular, reference is made to FIGURE 3 wherein it can be seen that the diaphragm 27 has a thick central rib portion 36 through which the aperture 34 passes, the aperture 34 defining a beveled surface 37 on the thick central portion 36 with the beveled portion 37 facing away from the outside surface 38 of the diaphragm 27 and making an angle therewith of approximately 30°.

As illustrated in FIGURES 4–6, the plate and post means 32 and 33 can be formed of molded plastic whereby the post means 33 is integral with the plate 32 and projects outwardly therefrom, the plate 32 having opposed flat surfaces 39 and 40 and being circular as illustrated in FIGURE 4.

The post 33 comprises a cylindrical portion 41 having an annular recess 42 provided therein adjacent the plate 32 and defining a beveled surface 43 facing the side 39 of the plate 32 and being adapted to mate with the beveled surface 37 on the diaphragm 27.

The post 33 includes a substantially I-shaped portion 44 having a keyhole shaped slot 45 passing therethrough in the manner illustrated in FIGURE 6, the end 23 of the rocker arm 21 can pass through the lower part of the slot 45 and have a recessed portion 46 thereof received in the upper narrow section to interconnect the rocker arm 21 to the post 33.

When a particular plate and post means 32 and 33 are assembled to a diaphragm 27, the post 33 is press-fitted through the aperture 34 until the thickened central portion 36 of the diaphragm 27 is snap-fittingly received in the recess 42 whereby the beveled surface 37 of the diaphragm 27 mates with the surface 43 of the post 33.

Thereafter, the interconnected plate 32 and diaphragm 27 are assembled in the counterbore 29 of the housing 11 whereby the cup-shaped housing 28 can be snap-fitted therein to define the chamber 30.

When a vacuum pump or the like has the inlet side thereof interconnected to the chamber 30 of an actuator 24, the vacuum created in the chamber 30 initially causes the underside 47 of the diaphragm 27 to tightly pull against the side 39 of the plate 32 whereby the diaphragm 27 engages the large area of the plate 32 to provide a fluid seal therebetween so that no leakage of air can pass through the aperture 34 thereof to the chamber 30.

Thereafter, the vacuum condition created in the chamber 30 pulls the diaphragm 27 and plate 32 downwardly in FIGURE 1 to open the valve members 17 in the manner previously described.

Therefore, it can be seen that an improved pneumatic actuator is provided by this invention wherein the plate and post means need not be riveted to the flexible diaphragm because the vacuum source creates the fluid seal between the diaphragm and the plate member when a vacuum condition exists in the vacuum chamber thereof.

Further, it can be seen that this invention provides improved parts for such a pneumatic actuator or the like.

While the form of the invention now preferred has been disclosed as required by the statutes, other forms may be used, all coming within the scope of the claims which follow.

What is claimed is:

1. In combination, a housing means, a flexible diaphragm carried by said housing means to define a chamber therewith, said diaphragm having a thick central portion provided with an aperture passing therethrough, said aperture defining an outwardly facing beveled surface adjacent the outside of said thick central portion and a cylindrical surface adjacent the inside thereof, and a flat plate disposed in said chamber and having an integral actuating post passing through said aperture whereby one side of said plate is adapted to be disposed against the inside surface of said diaphragm, said post having an annular recess therein adjacent said plate and snap-fittingly receiving said thick central portion of said diaphragm, said annular recess defining a beveled surface on said post mating with said beveled surface of said diaphragm and facing toward said plate and defining a cylindrical portion intermediate said plate and said beveled surface to face said cylindrical surface of said diaphragm whereby said diaphragm is pulled against said plate to provide a fluid seal around said aperture when a vacuum source is interconnected to said chamber.

2. A combination as set forth in claim 1 wherein said beveled surfaces make angles of approximately 30° with said plate.

3. A combination as set forth in claim 1 wherein said plate is circular.

4. A combination as set forth in claim 1 wherein said post has a cylindrical part above said recess and an I-shaped part above said cylindrical part.

References Cited
UNITED STATES PATENTS

| | | | |
|---|---|---|---|
| 1,035,803 | 8/1912 | Mintz | 251—61 X |
| 2,729,236 | 1/1956 | Valince | 92—99 X |
| 2,920,861 | 1/1960 | Hartmann | 251—357 |
| 3,125,003 | 3/1964 | Hoekstra | 92—96 X |
| 3,173,342 | 3/1965 | Wilson | 92—100 X |

MARTIN P. SCHWADRON, *Primary Examiner.*

MARK NEWMAN, *Examiner.*

I. C. COHEN, *Assistant Examiner.*